United States Patent Office 2,977,616
Patented Apr. 4, 1961

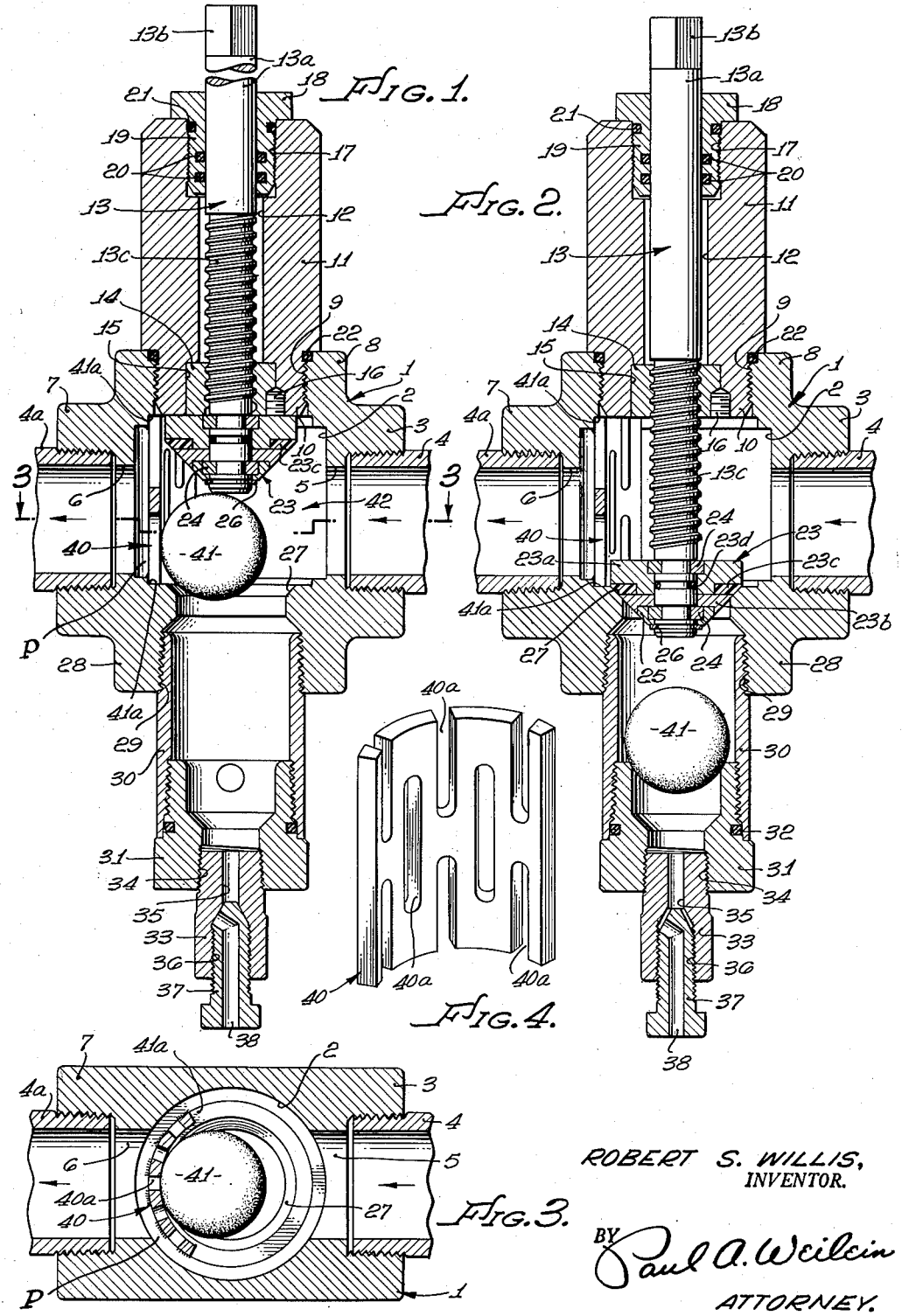

2,977,616

PIG BALL RECEIVER

Robert S. Willis, 4341 Olive, Long Beach, Calif.

Filed Aug. 28, 1959, Ser. No. 836,711

8 Claims. (Cl. 15—104.06)

The present invention relates to pig ball receiver or recovery devices which are adapted to receive or recover pig balls from a flow line through which the pig balls have been forced by fluid flowing through the lines to displace paraffin or other solid material deposits from the flow.

This application is a companion to my co-pending application filed concurrently herewith, Serial No. 836,712, relating to a pig ball injector and valve mechanism for placing a pig ball in a flow line.

The present invention is more particularly directed to a pig ball recovery device which has as objectives simplicity of construction and ease of opeartion and maintenance.

In accordance with the foregoing it is a further object to provide a housing having a valve chamber therein through which a valve member is adapted to extend but which when in its retracted position will permit the reception in the valve chamber of a pig ball travelling along with fluids leading into the valve chamber. Disposed within the valve chamber is a screen or grid adapted to permit the passage therethrough of fluid, while blocking the passage therethrough of the pig ball. Upon closure of the valve the pig ball is displaced from the valve chamber into a receiver housing through an opening in the valve housing which is closed off by the valve, thus enabling removal of the receiver housing and recovery of the pig ball without occasioning leakage of fluid from the valve housing.

Other objects and advantages of the invention will be hereinafter described or will become apparent to those skilled in the art, and the novel features of the invention will be defined in the appended claims.

Referring to the drawing:

Fig. 1 is a view in section illustrating the pig ball receiver assembly hereof with the valve disposed in a position for receiving a pig ball in the valve chamber;

Fig. 2 is a view corresponding to Fig. 1, but showing the pig ball displaced from the valve chamber into the receiver;

Fig. 3 is a horizontal sectional view as taken on the line 3—3 of Fig. 1; and

Fig. 4 is a detail view in perspective of the pig ball arresting grid of the invention.

Like reference characters in the several views of the drawing and in the following description designate corresponding parts.

Referring first to Fig. 1, the receiver of the invention comprises a valve housing generally designated 1 having an internal valve chamber 2. At one side of the housing 1 it is provided with an internally threaded neck 3 for connecting with a flow line 4, there being a bore 5 in the neck 3 leading into the valve chamber 2. Leading from the valve chamber 2 in the housing or body 1, is another port or bore 6 leading to an internally threaded neck 7 which is also adapted for connection to a flow line section 4a. Accordingly, it will be noted that the housing or body 1 virtually constitutes a coupling in a flow line.

The housing or body 1 is also provided with a neck 8 which is internally threaded as at 9 for reception of the reduced threaded end 10 of an elongated valve support 11. Extending through the support 11 is a bore 12 in which is rotatably extended a valve operating and ball displacing stem 13. The stem 13 has a smooth cylindrical section 13a and an outer extremity 13b formed for the reception of a tool as by the provision of a hexagonal or squared end thereon. The stem 13 is also provided with a threaded section 13c which is threadedly engaged with the bushing 14 disposed in a counterbore 15 in the support 11, and secured in place as by a screw 16 which engages both the bushing 14 and the support 11 so as to retain the bushing 14 in the counterbore 15.

At its outer extremity the support 11 is bored and tapped as at 17 for the reception of a centering and packing nut 18 having an elongated body 19 sealed as by O-rings 20 to the stem 13 and as by means of an O-ring 21 to the support 11. The support 11 is also sealed in relation to the neck 8 as by an O-ring 22 engaged between the latter.

On the inner end of the valve stem 13 is a rotatably mounted valve head 23 which is secured in place on the valve stem 13 between a pair of split bushings 24, 24 as by means of a retainer collar 25 and a split retainer ring 26 seating in at a peripheral groove in the stem 13. To facilitate assembly, the bushings 24, 24 are preferably composed of semi-circular half-sections. The head 23 is composed of a pair of annular members 23a and 23b which are held assembled between the bushings 24, the valve head part 23a being formed with a seat for an annular resilient seating element 23c. An O-ring or other appropriate seal 23d seals the head 23 against leakage between the latter and the valve stem 13.

Within the housing or body 1 at the base of the valve chamber 2 is a seat 27 with which the seating member 23c is engageable. Extending from the body or housing 1 in alignment with the support 11 is a neck 28. The neck 28 is threaded as at 29 for the reception of a threaded end of a pig ball receiver housing 30 of hollow generally tubular construction. The housing 30 has a closure plug 31 threaded into its outer end and sealed against the housing as by means of an O-ring seal 32.

Disposed in the closure plug 31 is a bleeder assembly comprising a plug 33 threaded into a bore 34 leading through the closure plug 31. The plug 31 is also provided with a port 35 communicating with a threaded bore 36 in which is disposed a bleed screw 37 which is ported as at 38 so that when the bleed screw 37 is threaded fully into the bore 36, as shown in Fig. 1, the port 38 through the bleed screw 37 will be closed upon engagement of the tapered inner end of the bleed screw with the tapered seating surface formed at the base of the bore 36. When the bleed screw is backed off of this tapered surface just mentioned above, the port 38 through the bleed screw will be opened.

The device thus far described is adapted to recover from the flow line 4 a pig ball which is being carried by fluid through the line 4 towards the line 4a. Accordingly, disposed within the valve chamber and bridging the opening leading to the flow line 4a is an arcuate grid 40 (see Fig. 4 for the details of the grid). The grid 40 is seated in arcuate seats 41a formed by opposed circumferential shoulders opposed to one another at opposite sides of the valve chamber 2. If desired, the grid 40 may be welded in p'ace in the seats 41a.

Referring particularly to Fig. 4, it will be noted that the grid has a plurality of flow passages 40a therethrough which are preferably composed of a series of longitudinally extended slots, but obviously, the grid may be provided with various forms of perforations or grid work to enable the passage of fluid.

In the use of the invention, the valve head 23 is positioned as shown in Fig. 1, that is, in its fully retracted position, so that fluid is free to pass through the grid 40 from the valve chamber 2. It should be noted that the openings 40a through the grid 40 are preferably of such proportions as to approximate or equal the cross-sectional flow area through inlet conduit 4, so as to offer no substantial resistance to flow through the grid. In addition, the valve chamber 2 affords a by-pass flow path P around the grid 40, as shown in Fig. 3, so that even when a pig ball 41 is disposed so as to partially obstruct the openings 40a, no significant reduction in flow area results. The principal purpose of the pig ball designated 41 is to remove deposits from the walls of the flow line 4 so as to enable it to be carried along in the fluid flow, and the large flow area through and around the grid 40 precludes the device from becoming clogged with the deposits which are entrained in the flowing fluid.

With the valve disposed as shown in Fig. 1, a pig ball 41 entering the valve chamber 42 will be arrested by the grid 40, whereupon rotation of the stem 13 in a clockwise direction will cause the valve head 23 to engage the pig ball and force it into the receiver housing 30, as the head moves toward the seat 27. Thus, the pig ball is first moved into the receiver and the valve is then closed, preventing the flow of fluid from the valve chamber through the valve seat upon displacement of the receiver housing 30.

The receiver housing 30 with the pig ball 41 therein is preferably vented through the bleed screw 37 following which the receiver housing 30 may be removed from the main housing 1 and the pig ball removed.

From the foregoing description it will be observed that the various objectives stated at the commencement hereof have been attained along with other objectives, and while specific structural details of the invention have been shown and described, it should be understood that changes and alterations may be resorted to without departing from the spirit of the invention as defined in the appended claims.

I claim:

1. A pig ball recovery device comprising: a body having a valve chamber therein; inlet and outlet means for said body; a valve support at one side of said valve chamber; a valve seat at the side of said valve chamber opposite said support; a valve member carried by said support and shiftable from one side of said valve chamber to the other to selectively open and close said valve seat; said body having an opening in line with said seat; said seat and said opening providing for the passage of a pig ball therethrough when said seat is open; a grid disposed across said outlet means; and pig ball receiver means joined to said body in line with said seat and said opening for receiving a pig ball passed through said opening.

2. A pig ball recovery device comprising: a body having a valve chamber therein; inlet and outlet means for said body; a valve support at one side of said valve chamber; a valve seat at the side of said valve chamber opposite said support; a valve member carried by said support and shiftable from one side of said valve chamber to the other to selectively open and close said valve seat; a grid disposed across said outlet means out of the path of movement of said valve member; said grid having openings therethrough having cumulative flow area approximately equal to that of the inlet means; and pig ball receiver means carried by said body opposite said seat and said valve member for receiving a pig ball through said seat when said seat is open.

3. A pig ball recovery device comprising: a body having a valve chamber therein; inlet and outlet means for said body; a valve support at one side of said valve chamber; a valve seat at the other side of said valve chamber; a valve member carried by said support and shiftable from one side of said valve chamber to the other to selectively open and close said valve seat; a grid disposed across said outlet means; pig ball receiver means carried by said body at the opposite side of said valve seat from said valve member; and means supporting said grid in spaced relation to the walls of the valve chamber to provide a flow path around the grid when a pig ball is engaged with said grid.

4. A pig ball recovery device comprising: a body having a valve chamber therein; inlet and outlet means for said body; a valve support at one side of said valve chamber; a valve seat at the other side of said valve chamber; a valve member carried by said support and shiftable from one side of said valve chamber to the other to selectively open and close said valve seat; a grid disposed across said outlet means; pig ball receiver means carried by said body at the opposite side of said valve seat from said valve member; said pig ball receiver means including a housing; and means removably connecting said housing to said body.

5. A pig ball recovery device comprising: a body having a valve chamber therein; inlet and outlet means for said body; a valve support at one side of said valve chamber; a valve seat at the other side of said valve chamber; a valve member carried by said support and shiftable from one side of said valve chamber to the other to selectively open and close said valve seat; a grid disposed across said outlet means; pig ball receiver means carried by said body at the opposite side of said valve seat from said valve member; said pig ball receiver means including a housing; means removably connecting said housing to said body; and means for venting said receiver housing.

6. A pig ball recovery device comprising: a body having a valve chamber therein; inlet and outlet means for said body; a valve support at one side of said valve chamber; a valve seat at the other side of said valve chamber; and a valve member carried by said support and shiftable from one side of said valve chamber to the other to selectively open and close said valve seat; a grid disposed across said outlet means; pig ball receiver means carried by said body at the opposite side of said valve seat from said valve member; said grid comprising a perforate plate disposed in said valve chamber out of the path of movement of said valve member; said valve member, seat and said receiver being in alignment axially of said body.

7. A pig ball recovery device comprising: a body having a valve chamber therein; inlet and outlet means for said body; a valve support at one side of said valve chamber; a valve seat at the other side of said valve chamber; and a valve member carried by said support and shiftable from one side of said valve chamber to the other to selectively open and close said valve seat; a grid disposed across said outlet means; pig ball receiver means carried by said body at the opposite side of said valve seat from said valve member; said grid comprising a perforate plate disposed in said valve chamber; said body having internal shoulders engaged by said plate for positioning the latter across the outlet means.

8. A pig ball recovery device comprising: a body having a chamber therein; inlet and outlet means communicating with said chamber; a pig ball arresting grid disposed in the path of a pig ball passing from said inlet to the outlet means; said body having an opening through which a pig ball may be removed from said chamber; a pig ball receiver housing removably carried by said body in communication with said chamber through said opening; and combined valve and pig ball engaging means carried by said body in line with said opening for forcing said pig ball itno said receiver housing and for preventing the flow of fluid from said housing through said opening.

References Cited in the file of this patent

UNITED STATES PATENTS

| 957,709 | Phillips | May 10, 1910 |
| 2,786,219 | Meyer | Mar. 26, 1957 |

FOREIGN PATENTS

| 309,344 | Great Britain | Apr. 11, 1929 |